(12) United States Patent
Lochocki, Jr. et al.

(10) Patent No.: US 8,475,335 B2
(45) Date of Patent: Jul. 2, 2013

(54) METHOD AND APPARATUS FOR ADAPTIVE CLUTCH CONTROL FOR A VEHICLE HAVING ENGINE START-STOP FUNCTIONALITY

(75) Inventors: Ronald F. Lochocki, Jr., Ypsilanti, MI (US); Joseph J. Page, Ann Arbor, MI (US); Sindu Sebastian, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 104 days.

(21) Appl. No.: 13/238,016

(22) Filed: Sep. 21, 2011

(65) Prior Publication Data
US 2013/0072348 A1 Mar. 21, 2013

(51) Int. Cl.
*F16H 61/48* (2006.01)
(52) U.S. Cl.
USPC .............................................. 477/54; 477/61
(58) Field of Classification Search
USPC ...................................... 477/54, 61
See application file for complete search history.

(56) References Cited

U.S. PATENT DOCUMENTS

| | | |
|---|---|---|
| 2010/0170740 A1 | 7/2010 | Lochocki, Jr. et al. |
| 2010/0304928 A1 | 12/2010 | Lochocki, Jr. et al. |
| 2011/0077830 A1 | 3/2011 | Lochocki, Jr. et al. |
| 2013/0023381 A1* | 1/2013 | Abboud et al. ............... 477/181 |

* cited by examiner

*Primary Examiner* — Dirk Wright
(74) *Attorney, Agent, or Firm* — Quinn Law Group, PLLC

(57) ABSTRACT

A vehicle includes an engine, torque converter, transmission, accumulator, sensor, and controller. The engine is automatically restarted in response to a start signal during an engine auto-start event. The transmission has a calibrated line pressure and a plurality (n) of clutches. The (n) clutches are engaged to execute the engine auto-start event. The accumulator delivers fluid under pressure to the transmission in response to the start signal. The controller controls (n−1) of the plurality (n) of clutches to the calibrated line pressure in response to detecting the start signal. The controller also modifies clutch fill parameters which control a fill sequence of the remaining clutch, i.e., the designated control clutch, as a function of a deviation of the measured turbine speed from a theoretical no-slip turbine speed. A system includes the transmission, sensor, accumulator, and controller. A method for controlling the designated clutch is also disclosed.

19 Claims, 2 Drawing Sheets

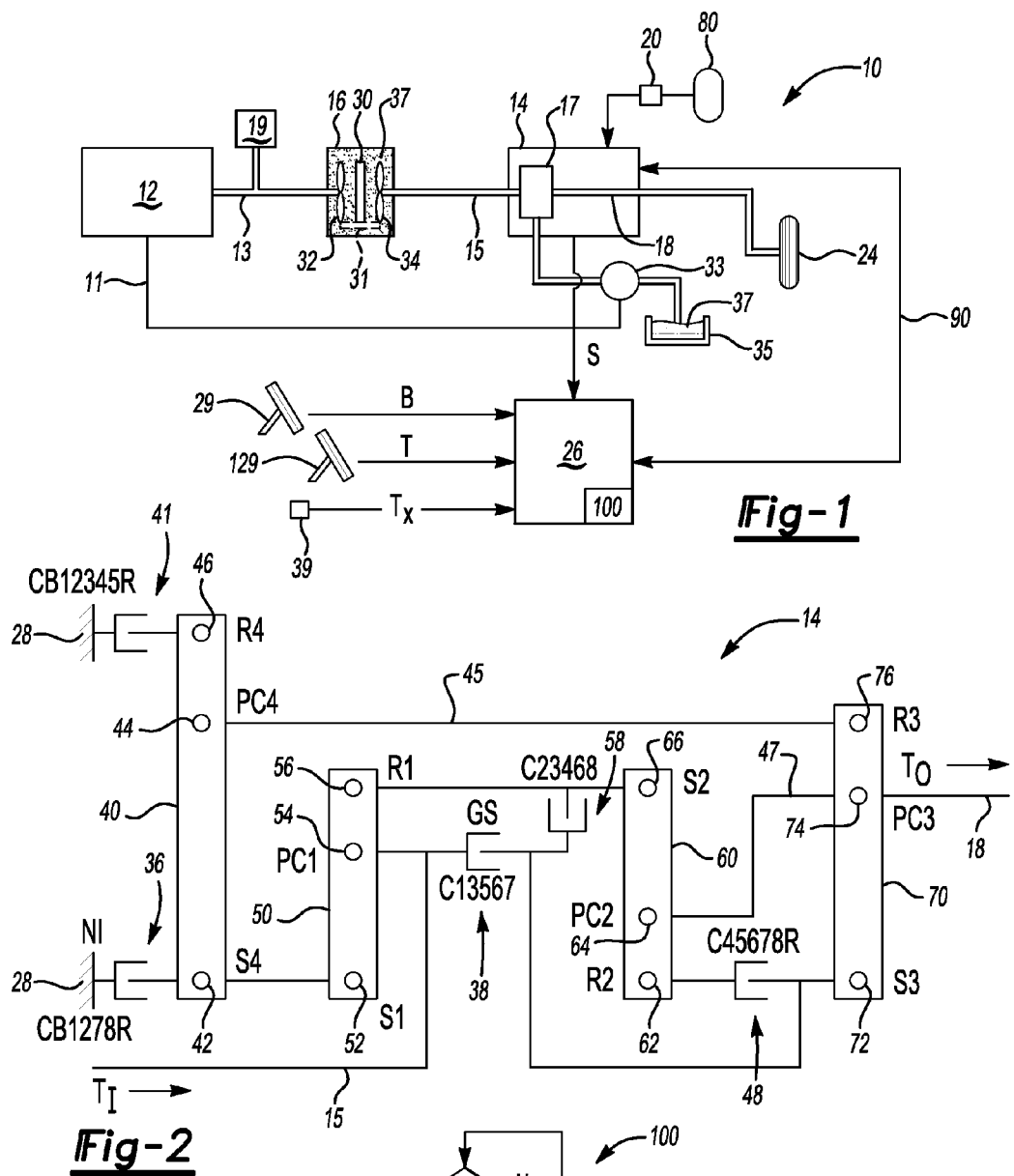
Fig-1
Fig-2
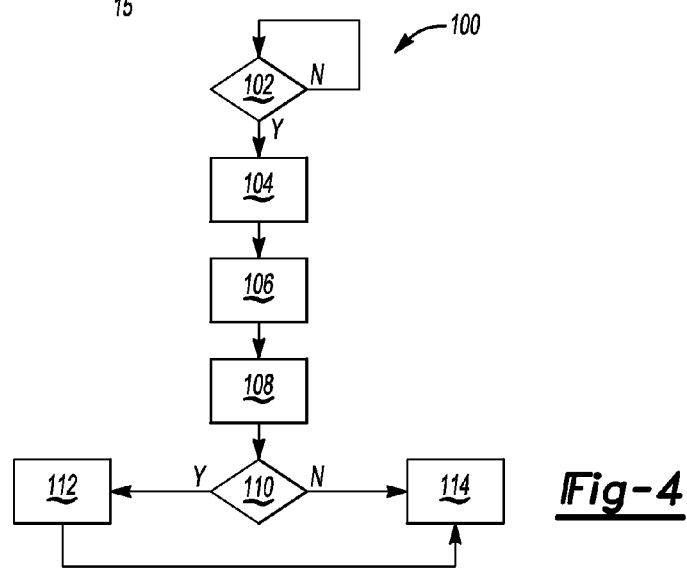
Fig-4

METHOD AND APPARATUS FOR ADAPTIVE CLUTCH CONTROL FOR A VEHICLE HAVING ENGINE START-STOP FUNCTIONALITY

TECHNICAL FIELD

The present disclosure relates to the shift control of a transmission in a vehicle having automatic engine start-stop functionality.

BACKGROUND

Vehicle transmissions are designed to transmit torque from an engine to a set of drive wheels in order to propel the vehicle through a range of output speeds. The engine output shaft may be selectively connected to a transmission input shaft when engine propulsion is required. In a manual transmission, a clutch pedal may be depressed to allow a driver to shift gears and/or to place the transmission into a neutral state. A hydrodynamic torque converter automatically provides the engine/transmission connection in an automatic transmission.

A torque converter includes an impeller/pump, a turbine, and a stator. The torque converter is filled with oil. The pump, which may be bolted to a rotating engine flywheel to thereby continuously rotate at engine speed, discharges the oil into the turbine through the stator. The fluid-driven turbine is connected to the transmission input shaft, and therefore rotation of the turbine ultimately causes a rotation of the coupled transmission input shaft. A variable level of slip occurs between the pump and turbine sides of the torque converter below a threshold lockup speed.

Use of a torque converter and the variable slip it provides thus enables a fluid coupling effect to occur between the engine and the transmission. This allows the vehicle to slow to a stop without stalling, while also allowing required torque multiplication to occur at low vehicle output speeds. In some vehicle transmissions the engine can be automatically shut off while the vehicle is stationary, e.g., while parked at a traffic light with the brake pedal applied, to minimize idle fuel consumption. After restart and launch, the torque converter can provide such torque multiplication to enhance the drive response at low speeds.

SUMMARY

A method is disclosed herein for use in a vehicle having an automatic transmission and engine automatic stop-start functionality. The requisite steps of the present method may be encoded as computer-executable process instructions and recorded on a tangible, non-transitory computer-readable medium. The process instructions may be executed from such a medium via an onboard controller. In doing so, the controller may generate values for a set of fill parameters used for fill control of a designated transmission clutch during the engine auto-start event. Execution of the present method can help to ensure that the transmission does not impart potentially objectionable noise, vibration, and harshness (NVH) to the powertrain upon engine restart and subsequent vehicle launch.

A user typically removes pressure from a brake pedal to commence engine restart. Therefore, this act may be detected in one embodiment to generate a start signal triggering the subsequent control actions explained herein. Upon detection of the start signal, various clutches are initially fed by a standby oil supply, e.g., a hydraulic surge accumulator, while the engine remains off. Of a plurality of transmission clutches that are engaged to launch the vehicle, (n−1) of these (n) clutches are immediately mapped to hydraulic line pressure, that is, immediately turned on full-open, rapidly filled, and locked to line pressure.

The remaining clutch is the designated control clutch. This clutch, unlike the (n−1) clutches that are mapped to line pressure, is adaptively controlled during the engine cranking and starting phase of the engine auto-start event. The controller uses a measured turbine speed as a feedback variable. The present method is "adaptive" in the sense that the values of the various control parameters used for re-applying the designated control clutch upon engine restart is tailored by the controller over time as needed as a function of the turbine speed. Such a speed may display characteristics that are unique to that particular vehicle. Thus, adapting to the performance of that particular vehicle rather than forcing a common calibration value on all vehicles in a given production release can provide an optimized level of NVH performance.

The set of clutch fill parameters for the designated control clutch may include one or more of the amplitude of a previously-learned return spring pressure command pulse for the designated control clutch, the duration of that pulse, and an apply rate subsequent to application of the pulse. The latter is described herein as being a ramp rate blending the return spring pressure command pulse up to line pressure. These parameters are modified by the controller as needed over time in response to actual "learned" behavior of the torque converter turbine for that particular vehicle. In this manner, the controller attempts to match, as closely as possible, a theoretical "flare-free" or no-slip turbine speed.

In particular, a vehicle is disclosed herein which includes an engine, a hydrodynamic torque converter, a sensor, a transmission, and a controller. The engine is configured to be automatically restarted in response to a detected start signal during an engine auto-start event. The torque converter has a turbine with a measurable turbine speed. The sensor measures the turbine speed and relays this value to the controller. The transmission has a calibrated line pressure and a plurality (n) of clutches that are engaged to execute the engine auto-start and subsequent launch event, e.g., from $1^{st}$ or $2^{nd}$ gear. A hydraulic accumulator delivers a volume of fluid under pressure to the transmission in response to the start signal to provide the initial surge of oil pressure needed to execute the start and launch.

A designated one of the plurality (n) of clutches is the designated control clutch during the auto-start event and launch. The controller maps the remaining (n−1) clutches of the plurality (n) of clutches to the calibrated line pressure in response to detecting the start signal, and receives the turbine speed from the sensor. The controller also modifies a set of clutch fill parameters which control a fill sequence of the designated control clutch as a function of a deviation of the measured turbine speed from a theoretical no-slip turbine speed.

A method for controlling the designated control clutch includes detecting a start signal for the auto-start event, and mapping, via the controller, the remaining (n−1) clutches of the plurality (n) of clutches to the calibrated line pressure in response to detection of the start signal. The method also includes receiving the turbine speed from the sensor via the controller and thereafter modifying a set of clutch fill parameters which controls a fill sequence of the designated control clutch as a function of a deviation of the measured turbine speed from a theoretical no-slip turbine speed.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of a vehicle having engine start-stop functionality and an automatic transmission that is controllable via the present method.

FIG. 2 is a lever diagram for an example 8-speed transmission that is usable with the vehicle shown in FIG. 1.

FIG. 4 is a flow chart describing an example control method for adaptively controlling a designated control clutch during an engine auto-start event and subsequent launch.

DETAILED DESCRIPTION

Figure 3:
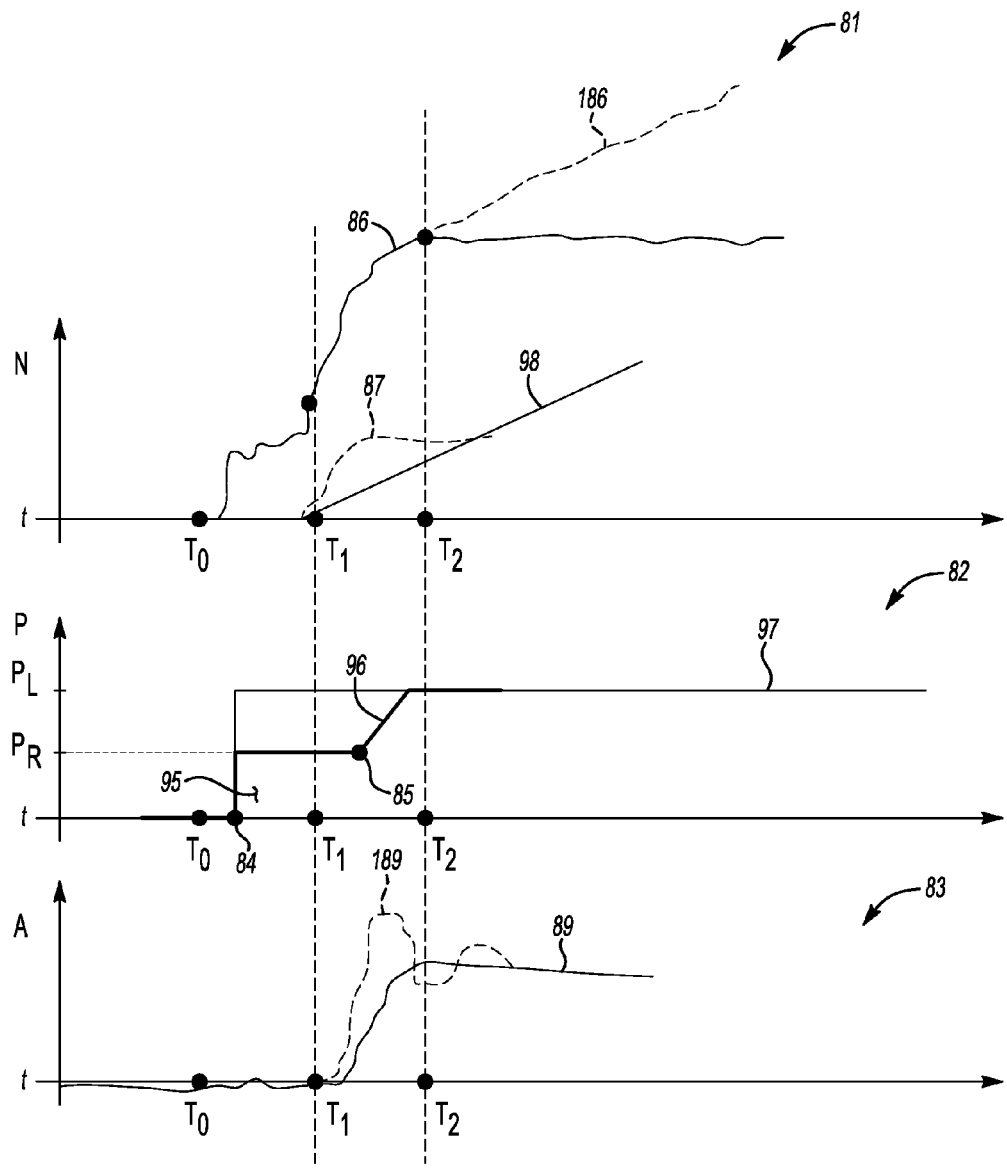
FIG. 3 is a plot versus time of various control parameters, i.e., engine and turbine speed, clutch line and return pressure, and vehicle body acceleration, for the vehicle shown in FIG. 1.

Referring to the drawings wherein like reference numbers correspond to like or similar components throughout the several figures, a vehicle 10 is shown schematically in FIG. 1. The vehicle 10 includes an engine 12, a multi-speed automatic transmission 14, and a controller 26. As explained in detail below with reference to FIGS. 3 and 4, the controller 26 controls a set of fill parameters of a designated clutch of the transmission 14 during an automatic restart of the engine 12. Execution of the present method may help to minimize noise, vibration, and harshness (NVH) upon restart and subsequent vehicle launch.

As is well understood in the art, engine auto start-stop functionality allows the engine 12 to be selectively shut off by an onboard controller 26 when the vehicle 10 is idle, e.g., while the vehicle 10 remains stationary at a traffic light with a brake pedal 29 applied. The engine 12 is then automatically restarted in an engine restart event, for instance when a driver of the vehicle 10 removes substantially all of the applied pressure (arrow B) to the brake pedal 29. Thus, in one embodiment the removal of substantially all applied pressure to the brake pedal 29 can be used as an example start signal by the controller 26 in triggering execution of the present method 100. The vehicle 10 is then launched once the engine 12 has attained a threshold rotational speed. Initial cranking may be supported by a cranking motor 19, for instance a small auxiliary electric motor or a high-voltage motor/generator unit depending on the design.

The engine 12 is coupled to the transmission 14 via a hydrodynamic torque converter 16. Such a torque converter 16 includes an engine-driven impeller/pump 32, a stator 30, and a turbine 34, with the latter being the fluid-driven member of the torque converter 16. The engine 12 has an output member 13 which is connected to the pump 32, and which rotates at engine speed. The transmission 14 includes an input shaft 15 which rotates at turbine speed, i.e., the rotational speed of the turbine 34. Transfer of an input torque to the transmission 14 thus occurs through the torque converter 16 as described below.

Viscous drag or other friction losses within the transmission 14 tend to reduce turbine speed to a level that is somewhat less than engine speed, as will be readily understood by those of ordinary skill in the art. Therefore, a lockup clutch 31 may be used to lock the two sides of the torque converter 16 together, i.e., the pump 32 and the turbine 34, so that these components can rotate in unison. Within the torque converter 16, the turbine 34 is driven by fluid 37. Thus, fluid-coupled rotation of the turbine 34 ultimately rotates the input shaft 15 of the transmission 14 at a rate or a speed that is less than or equal to engine speed.

The transmission 14 also has an output shaft 18. The output shaft 18 ultimately conveys transmission output torque from various clutch and gear sets 17 of the transmission 14 to thereby propel the vehicle 10 via a set of drive wheels 24. For simplicity, only one drive wheel 24 is shown in FIG. 1. The clutch and gear sets 17 can be selectively actuated through various electro-hydraulic controls powered by pressurized fluid delivered from an engine-driven main pump 33. The main pump 33 is configured to draw fluid 37 from a sump 35. The engine 12-to-main pump 33 connection is represented schematically in FIG. 1 as line 11. As will be readily appreciated by those having ordinary skill in the art, the actual connection may be, by way of example, a cam and love configuration or any other suitable means, such that the rotation of output member 13 of the engine 12 drives a periodic compression stroke of the pump 33.

Because the main pump 33 is driven by the engine 12, fluid pressure is interrupted when the engine 12 is turned off during an engine auto stop event. A hydraulic accumulator 80 is therefore used to store a sufficient volume of the fluid 37 under pressure. The various pipes or hoses placing the main pump 33 in fluid communication with the accumulator 80 are not shown in FIG. 1 for illustrative simplicity, but are sufficiently well known in the art. The accumulator 80 is charged by fluid pressure delivered from the main pump 33 whenever the main pump 33 is actively driven by the engine 12. A solenoid device 20 may be positioned between the accumulator 80 and the transmission 14 to block outlet flow from the accumulator 80 until needed.

When fluid pressure is required at restart of the engine 12 and subsequent launch of the vehicle 10, the accumulator 80 may be fired, e.g., by triggering the solenoid device 20 via the controller 26. Fluid released in this manner from the accumulator 80 may be directed into the clutch and gear sets 17 of the transmission 14 as an oil slug or fluid pulse. Such a pulse should have a duration that is long enough to allow the main pump 33 sufficient time to reach a threshold pumping capacity. The controller 26 thereafter controls the various clutch and gear sets 17 of the transmission 14 via control signals (arrow 90).

As will be described in detail below with reference to FIG. 2, the transmission 14 may include a designated neutral idle (NI) clutch for entering an NI state and a dedicated garage shift (GS) clutch for executing a garage shift. A GS event is defined herein as any shift from park/neutral (P/N) to drive (D), or from reverse (R) to drive (D), as is typified by a shift maneuver from a standstill whenever the vehicle 10 is parked in a garage.

NI is one possible transmission state during which the controller 26 can "learn" a set of initial values for the required return spring pressure for a designated clutch within the transmission 14. That is, during NI, the present controller 26 can learn the optimal return spring pressure (pulse amplitude) and its corresponding duration, i.e., how much time to spend filling the designated clutch to capacity. During NI, the transmission 14 is placed in a drive (D) setting while electro-hydraulic clutch pressure regulation valves (not shown) reduce pressure on a designated clutch, thereby placing the transmission 14 into a partially-loaded "hydraulic neutral" state.

That is, when a PRNDL shifter device (not shown) is set to park (P) or neutral (N) while the engine 12 is running, the vehicle 10 is considered to be in a true neutral (N) mode. By way of contrast, NI may be established when the transmission 14 of the vehicle 10 remains in drive (D) but the vehicle 10 is prevented from moving by application of a sufficient amount of braking force (arrow B) applied to the brake pedal 29. The controller 26, or alternately a separate transmission controller, can control a transition between the various states of transmission 14 using a plurality of different vehicle performance conditions.

Example vehicle performance conditions may include, but are not necessarily limited to: turbine speed (arrow $T_x$), a speed value which can be directly measured by one or more speed sensors 39 shown separately in FIG. 1 for clarity, but which could be positioned with respect to the turbine 34; vehicle speed; throttle level (arrow T) of a throttle input device such as the accelerator pedal 129; braking level (arrow B), e.g., the amount of pedal travel and/or a force applied to the brake pedal 29; a predetermined PRNDL setting (arrow S) of the transmission 14; a temperature of the fluid 37 in the sump 35 of the transmission 14; etc.

Still referring to FIG. 1, the engine 12 and the torque converter 16 are in communication with the controller 26, which is configured for storing and accessing process instructions embodying the present method 100. An example embodiment of method 100 is described below with reference to FIG. 4. The controller 26 can be configured as a microprocessor-based device having such common elements as a microprocessor or CPU, memory including but not limited to: read only memory (ROM), random access memory (RAM), electrically-programmable read-only memory (EPROM), etc., and circuitry including but not limited to: a high-speed clock (not shown), analog-to-digital (A/D) circuitry, digital-to-analog (D/A) circuitry, a digital signal processor (DSP), and the necessary input/output (I/O) devices and other signal conditioning and/or buffer circuitry. The controller 12 is configured to execute process instructions embodying the present method from tangible, non-transitory computer-readable medium, e.g., tangible memory.

Referring to FIG. 2, in an example embodiment the transmission 14 of FIG. 1 may be configured as an 8-speed transmission having a plurality of gear sets and clutches, i.e., the clutches and gears 17. In particular, a braking clutch 36 (CB1278R) may be engaged in each of $1^{st}$, $2^{nd}$, $7^{th}$, $8^{th}$, and reverse (R) gears. Another braking clutch 41 (CB12345R), like clutch 36, selectively connects an element of a first gear set 40 to a stationary member 28 when engaged. Either of these clutches 36 and 41 may be used as a designated NI clutch when NI functionality is present.

Clutches 36 and 41 are connected to respective nodes 42 and 46 of a gear set 40. In one embodiment, node 42 can be a sun gear (S4) of the gear set 40, while node 46 may be a ring gear (R4) of the same gear set 40. The gear set 40 also includes a node 44, which may be a carrier member (PC4) in the particular embodiment shown in FIG. 2.

Node 42 is also connected to a node 52 of another gear set 50. In one embodiment, the gear set 50 may be a planetary gear set wherein the nodes 52, 54, and 56 are a sun gear (51), a carrier member (PC1), and a ring gear (R1), respectively. Node 54 of the gear set 50 is connected to an input side of a rotating clutch 38 (C13567), which may be a designated a garage shift (GS) clutch. The input shaft 15 of transmission 14 of FIG. 1 is also connected to the input side of clutch 38 and carries an input torque (arrow $T_I$). Node 56 is connected to a gear set 60 as explained below.

The gear set 60 includes nodes 62, 64, and 66, which in one embodiment may be ring gear (R2), carrier member (PC2), and sun gear (S2), respectively. A rotating clutch 58 (C23468) may be connected between the output of clutch 38 and node 66, and between node 56 of the second gear set 50 and node 66 of the gear set 60. Node 62 may be connected to another gear set 70 having nodes 72, 74, and 76. Node 76 may be continuously connected to node 44 via a connecting member 45. In one embodiment, the nodes 72, 74, and 76 may be a sun gear (S3), carrier member (PC3), and ring gear (R3), respectively. In particular, node 62 may be connected to node 72 via a rotating clutch 48 (C45678R). Node 64 of gear set 60 may be directly connected to node 74 of gear set 70 via a connecting member 47, which in turn may be connected to the transmission output shaft 18 (also see FIG. 1). Node 74 is connected to the output shaft 18 and delivers output torque (arrow $T_O$) to the drive wheels 24 shown in FIG. 1.

Referring to FIG. 3, time plots are shown for three different concurrent control values used for controlling the fill of a designated control clutch of the transmission 14 shown in FIG. 1. After the vehicle 10 of FIG. 1 coasts to a stop and the engine 12 shuts down, all of the clutches of transmission 14 are disengaged and exhausted. The accumulator 80 of FIG. 1 is fully charged during the immediately-prior drive cycle.

In the example 8-speed embodiment of FIG. 2, three clutches, i.e., 36, 38, and 41, must engage to complete the required power flow during a restart and launch from $1^{st}$ gear. Of this plurality (n) of engaged clutches, (n−1) clutches are immediately mapped to line pressure and receive a high flow of oil, initially from the accumulator 80, to both fill and reapply, e.g., clutches 38 and 41. In this instance, clutch 36 (CB1278R) is left as the designated control clutch for control via the present method 100 during restart of the engine 12 and launch of the vehicle 10 shown in FIG. 1.

The designated control clutch is provided by the controller 26 of FIG. 1 with a controlled fill via active pressure control, and then commanded to reapply. Fill initially occurs at a pre-learned return spring pressure for that clutch. As noted above, such a learning phase may occur during a previous NI maneuver, or alternatively during a previous garage shift. Likewise, the fill duration of the designated control clutch is provided at a previously learned or calibrated duration. The controller 26 continues to adapt this fill duration, and/or its amplitude/return spring pressure and/or its fill rate, as a function of turbine speed to attain an optimal shift feel.

In particular, time plot 81 of FIG. 3 presents engine speed (N) on the vertical axis versus time (t) on the horizontal axis. The engine restart event commences at approximately $T_0$, e.g., when a driver removes pressure from the brake pedal 29 of FIG. 1. After a short delay, engine speed (trace 86) begins to rise. When the engine 12 has reached sufficient speed, approximately at $T_2$, the engine 12 is started. Thereafter, engine speed (trace 86) flattens out as shown during a zero-throttle start, i.e., when the engine 12 starts but a driver does not depress the accelerator pedal 129. Alternative engine speed trace 186 shows what occurs if a driver provides a moderate amount of throttle. The pitch of the alternative engine speed trace 186 will vary with respect to engine speed (trace 86) after time $T_2$ in a manner that depends on the amount of throttle input.

Time plot 81 also depicts a theoretical turbine speed (trace 98). Theoretical turbine speed (trace 98) shows the theoretical value of the speed of turbine 34 of FIG. 1 absent any slippage of the applied clutches, i.e., as if all applied clutches were fully locked during the launch. With any amount of clutch slip or flare present in the control clutch, however, the actual turbine speed may diverge from that depicted in trace 98 as shown via the flare of trace 87 between $T_1$ and $T_2$. Thus, the speed of the turbine 34 of FIG. 1 is measured via sensors 39 and fed back to the controller 26. The controller 26 uses the turbine speed as a feedback value in determining whether and how to vary the apply commands to the designated control clutch.

Still referring to FIG. 3, time plot 82 depicts a clutch pressure (P) delivered to the various engaged clutches. The (n−1) clutches that are not adaptively controlled as set forth hereinbelow are immediately driven to line pressure $P_L$ (trace 97), i.e., at a time point 84 shortly after $T_0$ and before $T_1$. A fill pulse 95 to the designated control clutch is initially raised to the level of its previously learned return spring pressure $P_R$, i.e., sometime between $T_1$ and $T_2$. At approximately point 85, which is shown shortly after $T_1$ when turbine speed (trace 98) starts to ramp up, the apply rate of the designated control clutch is controlled in a loop by the controller 26 using the actual/measured speed of the turbine 34 shown in FIG. 1 as a feedback value. That is, the apply rate, or the slope of trace 96 after point 85 blending the return spring pressure to the line pressure (trace 97), and/or the amplitude and/or duration of the fill pulse 95, are adjusted based on the amount of flare seen in the measured turbine speed. Such flare is indicated via the turbine speed trace 87 of time plot 81.

Also shown in FIG. 3 is a representative time plot 83 of vehicle 10 acceleration, i.e., the linear acceleration of a body of the vehicle 10. Trace 89 shows an ideal acceleration profile for an optimal amount of capacity to the control clutch as the engine 12 restarts. Trace 189 shows an example profile for too aggressive of a clutch fill profile for the same control clutch. Such a profile, if severe enough, may produce NVH that is perceptible to some users. The controller 26 of FIG. 1 thus executes the present method 100 to alleviate this condition during engine restart and launch.

Referring to FIG. 4, an example method 100 is shown for controlling the designated control clutch during the automatic restarting of the engine 12 and launch of the vehicle 10 shown in FIG. 1. During the calibration phase, the pressure profiles for each clutch of the transmission 14 are set, including for the designated control clutch. For instance, referring briefly to FIG. 3, the amplitude and duration of fill pulse 95 can be determined using a calibration vehicle and thereafter recorded in memory of the controller 26. The slope of trace 96 may be similarly determined and recorded. The controller 26 thereafter periodically or continuously adapts one or more of these values, referred to herein also as fill parameters, to conform to actual powertrain performance. Such performance can be expected to vary to some extent from vehicle to vehicle depending on different use, wear, programming variances, or other factors.

Beginning with step 102, the controller 26 of FIG. 1 determines whether a restart of engine 12 is presently commanded. Step 102 may entail detecting a level of pressure applied by a driver of the vehicle 10 to the brake pedal 29. The method 100 proceeds to step 104 if an autostart event is initiated by the driver. Otherwise, the controller 26 executes step 102 in a loop until such an event is detected.

At step 104, the controller 26 triggers the solenoid device 20 of FIG. 1 to release pressurized fluid from the hydraulic accumulator 80. Of the plurality (n) of clutches uses in the transmission 14 to execute engine start and vehicle launch, a designated control clutch is controlled according to the following steps, while the remaining (n−1) clutches are immediately filled/mapped to line pressure, i.e., trace 97 of time plot 82 as shown in FIG. 3. Thus, the (n−1) clutches that are immediately mapped to line pressure are rapidly filled and reapplied as holding clutches. The method 100 proceeds to step 106.

At step 106, the speed of the turbine 34 shown in FIG. 1 is measured and transmitted to the controller 26. Step 106 may entail directly sensing the rotary speed of the turbine 34 using one or more of the sensors 39 shown in FIG. 1, by calculation, or by any other suitable means. The method 100 proceeds to step 108 once turbine speed is recorded.

At step 108, the controller 26 of FIG. 1 compares the profile of the measured turbine speed to its theoretical value, i.e., trace 98 of the time plot 81 shown in FIG. 3. Step 108 may entail calculating a deviation of the actual turbine speed from that of the theoretical slip-free trace 98, and then recording the variance in memory of the controller 26. Once recorded, the method 100 proceeds to step 110.

At step 110, the controller 26 next determines whether an amount of flare indicated by the deviation determined at step 108 is improving relative to prior-recorded deviations, or if it is becoming worse. The method 100 proceeds to step 112 if the deviation is improving (approaching zero) or holding steady. However, the method 100 proceeds to step 114 if the deviation is worsening.

At step 112, the controller 26 of FIG. 1 controls the designated control clutch according to its previously-learned/previously-adapted return spring pressure. For instance, referring briefly to the time plot 82 shown in FIG. 3, the length and amplitude of the fill pulse 95 can be applied without further adaptation, and the apply rate/slope of trace 96 can remain unchanged. The controller 26 executes the clutch fill sequence according to fill pulse 95 and its trace/ramp 96 until just before $t_2$, thereafter merging with line pressure (trace 97).

All (n) clutches used for executing the start and launch maneuver are thus engaged when the engine 12 is started and the vehicle 10 launches. For instance, in the example transmission 14 of FIG. 2, clutches 36, 38, and 41 could all be engaged when launching from $1^{st}$ gear, with any one of these (n) clutches being the designated control clutch and the other two being locked to line pressure at $t_0$ (see FIG. 3). Second gear launch could be affected via clutches 36, 41, and 58 in the same manner.

At step 114, the controller 26 of FIG. 2 adapts or modifies a pressure profile of the designated control clutch to reduce the amount of flare present in the measured turbine speed. Referring to time plot 82 of FIG. 3, flare may result if the apply phase of trace 96 commences late. That is, the designated control clutch may slip. Thus, the controller 26 can change the pressure profile of the control clutch over time as needed, such as by varying the amplitude of the fill pulse 95, its duration, and/or the ramp rate (trace 96) from a pre-learned return spring pressure as explained above. Once so adapted, the controller 26 can record the new values in memory and proceed to step 112.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an engine configured to be automatically restarted in response to a start signal during an engine auto-start event;
   a torque converter having a turbine with a measurable turbine speed;
   a sensor operatively connected to the turbine and configured to measure the turbine speed;
   a transmission having a calibrated line pressure and a plurality (n) of clutches that are engaged to execute the engine auto-start event, wherein a designated one of the plurality (n) of clutches is a designated control clutch during the engine auto-start event;

a hydraulic accumulator in fluid communication with the transmission that is configured for delivering a volume of fluid under pressure to the transmission in response to the start signal; and a controller configured for:
receiving the start signal;
mapping the remaining (n−1) clutches of the plurality (n) of clutches to the calibrated line pressure in response to receipt of the start signal;
receiving the turbine speed from the sensor; and
modifying a set of clutch fill parameters which controls a fill sequence of the designated control clutch as a function of a deviation of the measured turbine speed from a theoretical no-slip turbine speed.

2. The vehicle of claim 1, wherein the transmission is an 8-speed automatic transmission.

3. The vehicle of claim 2, wherein the plurality (n)=3.

4. The vehicle of claim 1, wherein the set of clutch fill parameters includes one of: a return spring fill pulse amplitude and a return spring fill pulse duration.

5. The vehicle of claim 4, wherein the set of clutch fill parameters includes the return spring fill pulse amplitude and the return spring fill pulse duration, and further includes a return spring ramp rate which blends the return spring fill pulse into the calibrated line pressure.

6. The vehicle of claim 1, wherein the controller is configured to launch the vehicle after the engine auto-start event from one of first and second gear using the designated control clutch.

7. A system for a vehicle having a hydrodynamic torque converter and an engine configured to be automatically restarted during an engine auto-start event, the system comprising:

an automatic, multi-speed transmission having a calibrated line pressure and a plurality (n) of clutches that are engaged to execute the engine auto-start event, wherein a designated one of the plurality (n) of clutches is a designated control clutch during the auto-start event;

a hydraulic accumulator in fluid communication with the (n) clutches;

a sensor operatively connected to a turbine of the torque converter, wherein the sensor is configured to measure a rotational speed of the turbine; and a controller in communication with the sensor;
wherein the controller is configured for:
receiving the start signal; commanding delivery of a volume of oil from the accumulator to the transmission in response to receipt of the start signal by the controller;
mapping the remaining (n−1) clutches of the plurality (n) of clutches to the calibrated line pressure in response to receipt of the start signal;
receiving the turbine speed from the sensor; and
modifying a set of clutch fill parameters which controls a fill sequence of the designated control clutch as a function of a deviation of the measured turbine speed from a theoretical no-slip turbine speed.

8. The system of claim 7, wherein the transmission is an 8-speed automatic transmission.

9. The system of claim 7, further comprising:
a solenoid device in fluid communication with the transmission and with the accumulator, and in electrical communication with the controller, wherein the solenoid device selectively admits fluid from the accumulator to the transmission when triggered by the controller.

10. The system of claim 7, wherein the plurality (n)=3.

11. The system of claim 7, wherein the set of clutch fill parameters includes one of: a return spring fill pulse amplitude and a return spring fill pulse duration.

12. The system of claim 11, wherein the set of clutch fill parameters includes the return spring fill pulse amplitude and the return spring fill pulse duration, and further includes a ramp rate which blends the fill pulse into the calibrated line pressure.

13. The system of claim 7, wherein the controller is configured to launch the vehicle after the engine is restarted from one of first and second gear using the designated control clutch.

14. A method for controlling a designated control clutch in a transmission aboard a vehicle during an engine auto-start event, wherein the transmission uses a calibrated line pressure and includes a plurality (n) of clutches that are engaged to execute the engine auto-start event and a hydraulic accumulator in fluid communication with the transmission, the method comprising:

receiving a start signal for the auto-start event;
mapping, via a controller, the remaining (n−1) clutches of the plurality (n) of clutches to the calibrated line pressure in response to detecting the start signal;
receiving the turbine speed from the sensor via the controller; and
modifying a set of clutch fill parameters which controls a fill sequence of the designated control clutch as a function of a deviation of the measured turbine speed from a theoretical no-slip turbine speed.

15. The method of claim 14, wherein receiving a start signal for the auto-start event includes receiving a measured force applied to a brake pedal.

16. The method of claim 14, wherein modifying a set of clutch fill parameters includes modifying at least one of a pre-learned return spring fill pulse amplitude and a pre-learned return spring fill pulse duration.

17. The method of claim 16, wherein modifying the set of clutch fill parameters further includes modifying a return spring ramp rate which blends the return spring fill pulse into the calibrated line pressure.

18. The method of claim 16, further comprising:
recording the pre-learned return spring fill pulse amplitude and pre-learned return spring fill pulse duration during one of a neutral-idle shift and a garage shift.

19. The method of claim 14, further comprising: launching the vehicle after the engine auto-start event from one of first and second gear using the designated control clutch.

* * * * *